May 27, 1958 W. SCHAELCHLIN ET AL 2,836,074
CONTROL APPARATUS
Original Filed June 18, 1952 4 Sheets-Sheet 1

INVENTORS
Walter Schaelchlin
and Clarence E. Gary.
BY
Paul E. Friedemann
ATTORNEY May 27, 1958   W. SCHAELCHLIN ET AL   2,836,074
CONTROL APPARATUS Original Filed June 18, 1952   4 Sheets-Sheet 2

INVENTORS
Walter Schaelchlin
and Clarence E. Gary.
BY
Paul E. Friedemann
ATTORNEY

United States Patent Office 2,836,074
Patented May 27, 1958

2,836,074
CONTROL APPARATUS

Walter Schaelchlin and Clarence E. Gary, Buffalo, N. Y., assignors to Westinghouse Electric Corporation, East Pittsburgh, Pa., a corporation of Pennsylvania Original application June 18, 1952, Serial No. 294,149. Divided and this application September 15, 1953, Serial No. 380,194

15 Claims. (Cl. 74—395)

This invention relates generally to mechanical drives and more in particular, to such drives which are adaptable for controlling the relative positions or the relative speeds of a pair of movable members.

This application is a division of a copending application of the Schaelchlin et al., Serial No. 294,149, filed June 18, 1952, entitled, Control Apparatus, and assigned to the assignee of this invention.

Applications of the type generally referred to hereinabove are found, for example, in the control of the separate sections of a paper mill. In such an application it is necessary in some instances to control the relative speeds of the stands to maintain the proper relationship between the peripheral speeds of the rolls and in other instances it is necessary to maintain a fixed angular position relationship between the rolls of the respective stands. In such a drive a reference control quantity is utilized as a basis for speed or position regulation. This quantity is usually differentially compared with a quantity corresponding to the speed or position of a machine driving a given stand in order to obtain an error quantity indicative of the control which is required to bring the given machine into position or speed correspondence with the reference quantity.

In many such applications mechanical types of differentials may be utilized to obtain the error quantity and in order to achieve a degree of drive flexibility in situations, for example, where the speeds of the successive stands may not be identical, it is desirable to provide a form of variable speed device between the machine driving a given stand and one input to the differential associated with and driven by that particular machine. Arrangements of this type are frequently cumbersome and expensive to build and if not properly designed, may require too much maintenance service.

Accordingly, it is one object of this invention to provide a unitary mechanical drive involving a variable speed input to one side of a differential.

Another object of this invention is to provide a drive of the character referred to which is simple with respect to operational requirements and positive in operation.

A further object of this invention is to provide a variable speed differential drive of a compact nature.

More specifically stated with respect to the preceding object, it is an object of this invention to provide a variable speed cone pulley drive for one side of a differential unit wherein the differential unit is mounted completely within a hollow end of one of the cone pulleys.

In sectionalized mill drives provision must be made for obtaining an adjustable amount of draw between the respective mill stands. The apparatus herein generally described embodying the variable speed cone pulley drive affords adjustment of the amount of draw between the mill sections by means of adjustment of the belt of the cone pulley drive along the cone pulleys to vary the drive ratio from the driving to the driven pulley. The setting of the draw adjustment for normal operation, during which the web is being fed through the respective sections of the mill, is frequently not satisfactory for a threading operation when a new web is being threaded through the mill. The draw may be varied by manipulating the mechanism which drives the belt shifter carriage to vary the draw as required during the threading operation, whereafter during continued operation this same mechanism may be further adjusted to move the belt shifter carriage to obtain the required draw for continued mill operation. In many respects this adjustment is unwieldy.

Accordingly, it is a further object of this invention to provide a variable speed drive of the character referred to wherein provision is made for incremental adjustment of the belt shifter with respect to the belt shifter carriage to obtain small adjustments of the relative speeds of the cone pulleys without moving the belt carriage.

The foregoing statements are merely illustrative of the various aims and objects of this invention. Other objects and advantages will become apparent upon a study of the following disclosure when considered in conjunction with the accompanying drawings, in which.

Figure 1:
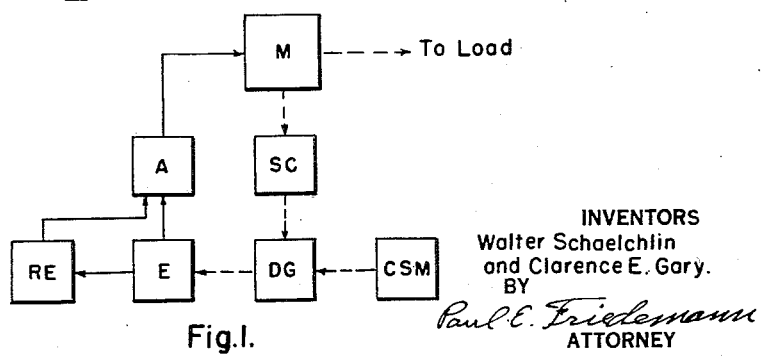
Fig. 1 is a block diagram illustrating an application of the present invention.

Fig. 1 illustrates a control of a single motor designated by the block M utilized to drive a load such as one section of a mill. The speed of this motor is compared with the speed of a constant speed motor CSM which drives one side of a differential designated DG. The other side of this differential is driven by a speed changer designated SC which in turn is driven by the motor which is to be controlled. The speed changer SC permits varying the speed of the motor M with respect to the constant speed motor CSM by providing a step-up or reduction in the speed at which the associated input of the differential DG is driven. The output of the differential in angular position at any instant with respect to a given reference angular position is an indication of a difference in speeds between the motor M and the constant speed motor. This angular position shift is detected by a position error detector designated E, the output of which may be applied through suitable electric amplifying means A to the motor M to control the motor speed as required. A rate signal may be introduced at this point by means of a rate of error detector RE which, for example, may be responsive to the rate of change of electric output of the position error detector E and its output utilized to further control the amplifying means A. A control of a second section of the mill may be obtained with a control corresponding to that illustrated in Fig. 1 and having as its reference the mechanical output of the constant speed motor CSM or a corresponding motor energized from the same source as the illustrated constant speed motor. The draw between these two sections may be adjusted by one or both of the respective speed changers in such a system to control the amount of sag-back in the web between the respective sections.

Figure 2:
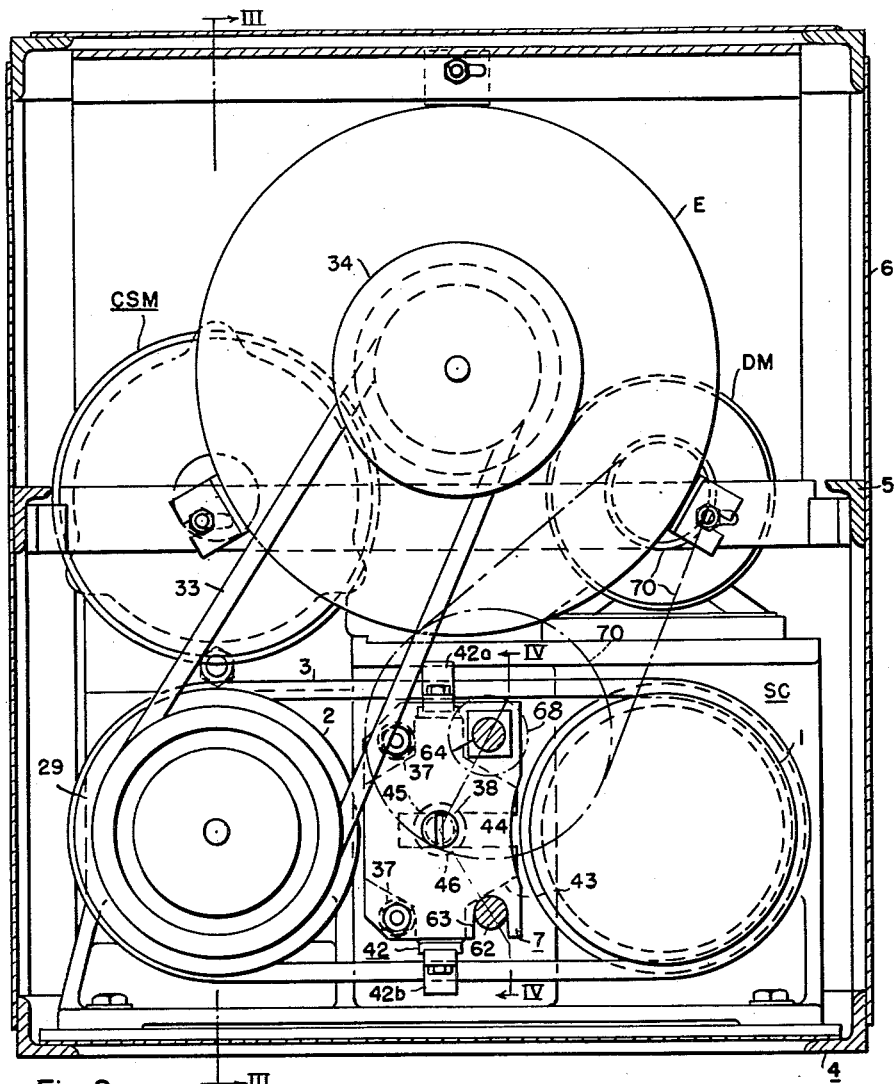
Fig. 2 is an end view fragmentarily in section of a mechanical drive embodying the principles of this invention.
Figure 3:
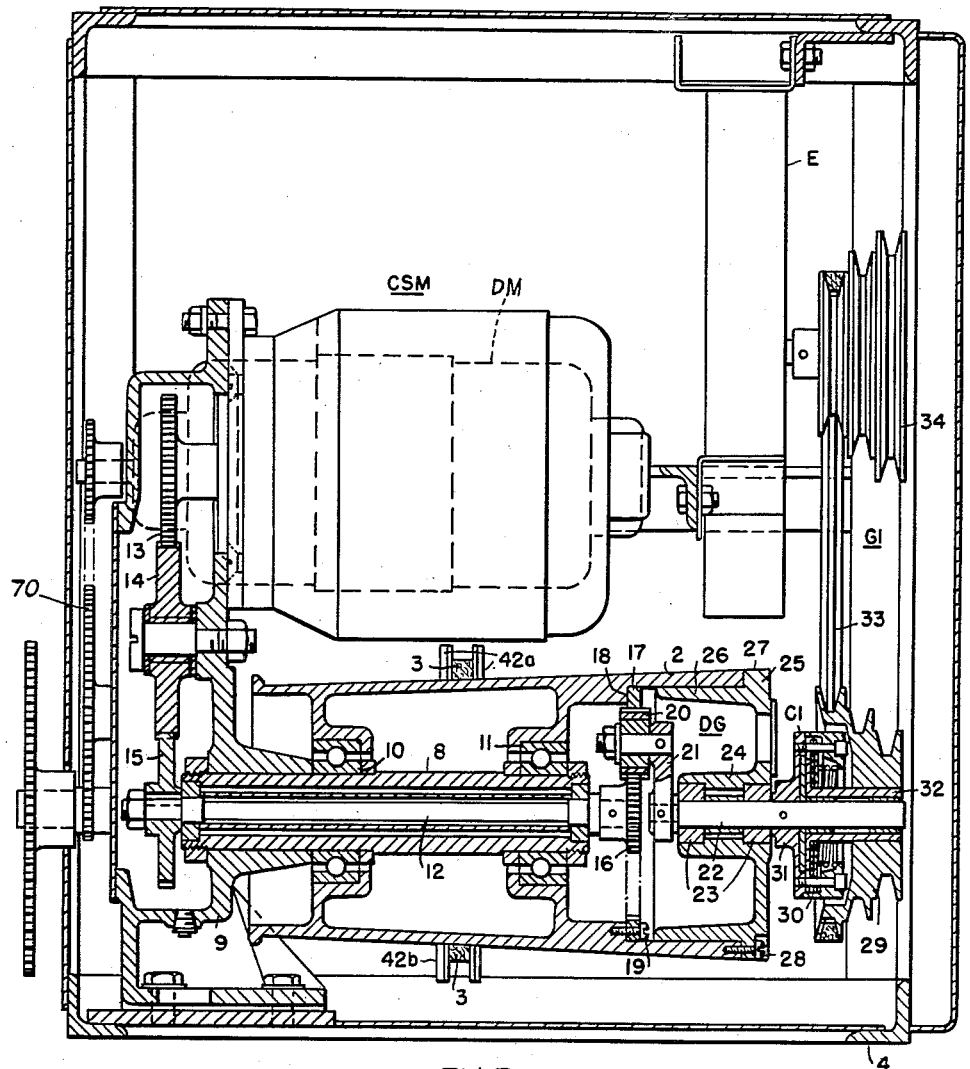
Fig. 3 is a longitudinal sectional view taken approximately on the line III—III of Fig. 2.
Figure 4:
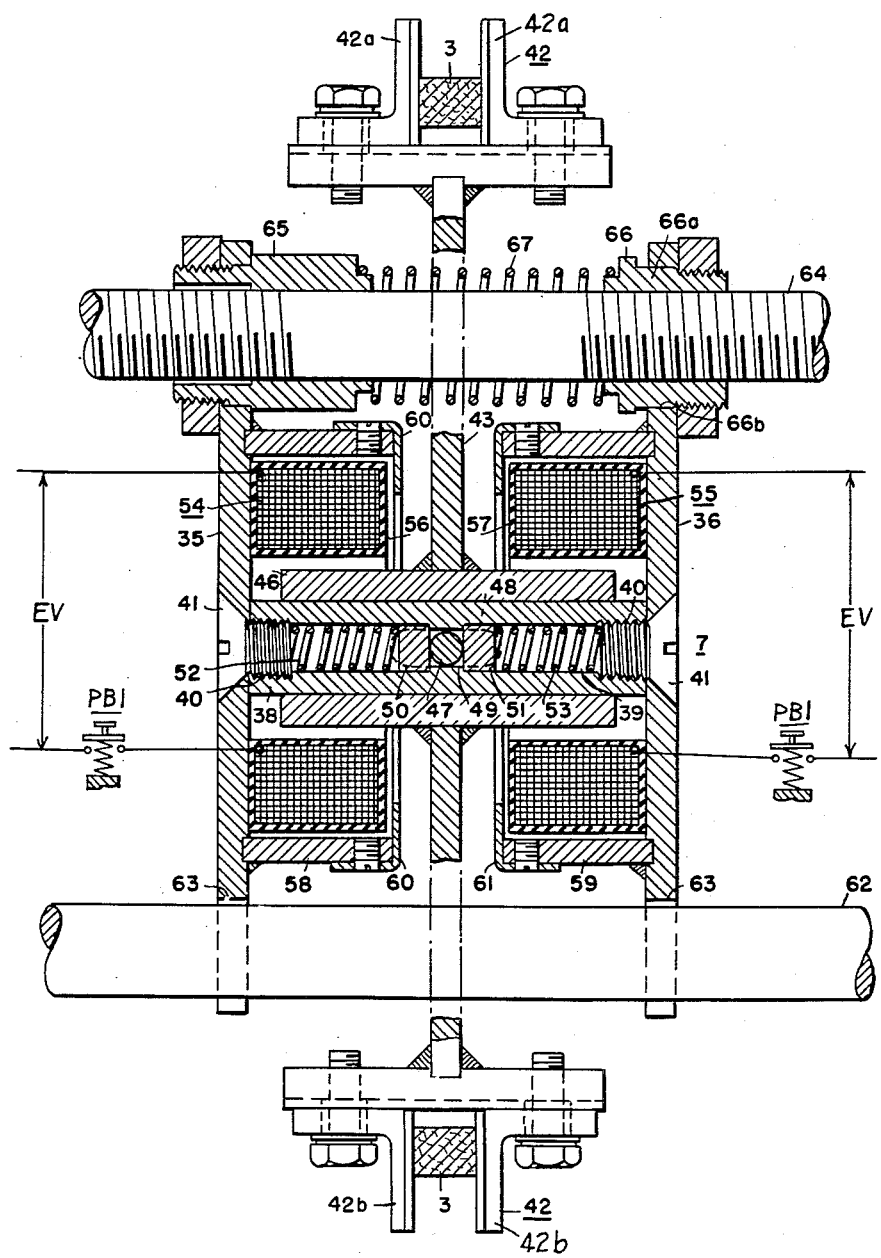
Fig. 4 is a sectional view taken approximately on line IV—IV of Fig. 2.

The details of the mechanical drive schematically illustrated in Fig. 1 appear in Figs. 2, 3 and 4 wherein the speed changer SC, involving a pair of cone pulleys 1 and 2 connected by a belt 3, the differential gear DG, the constant speed motor CSM and the position error detector E are mounted upon a common support or housing generally designated 4. This housing is fabricated of a plurality of angle sections 5 and cover plates 6 of a dimension and configuration to completely enclose the generally designated items.

The belt 3 is engaged by a belt shifter assembly generally designated 7 disposed between the cone pulleys which is provided to adjust the belt 3 axially of the cone pulleys to provide a variation in the drive ratio therebetween. Thus depending upon the position of the belt 3 along the respective cone pulleys 1 and 2, the cone pulley 2, which is the driven pulley, will be operating at some speed either equal to, greater than or less than the speed of the cone pulley 1. Cone pulley 1 may be directly connected to a motor, such as M, which is to be regulated.

Compactness of this mechanical construction is achieved as illustrated in section in Fig. 3 by mounting the mechanical differential DG completely within the larger end of hollow cone pulley 2. In this construction cone pulley 2 is journalled about a hollow spindle 8 which is anchored in a support bracket 9 secured to the housing base. The bearings providing free rotation of cone pulley 2 about the hollow spindle 8 are designated 10 and 11 and are mounted at axially spaced points along the hollow spindle 8.

One of the input shafts to the differential DG is concentrically journalled within the hollow spindle 8. This differential input shaft is designated 12. The left end of this input shaft is connected by a gear train comprising gears 13, 14 and 15 to the constant speed motor CSM, which is mounted to the upper end of the bracket 9. Thus input shaft 12 is driven at a constant speed by the constant speed motor.

The illustrated differential is assembled of a plurality of spur gears. The sun gear 16 representing one point of input to the differential unit is secured to the right end of the differential input shaft 12. The second input point of this drive is represented in the internally toothed ring gear 17 which is securely mounted against a shoulder 18 formed integrally within the cone pulley 2. This secure mounting may be achieved by means of screws 19 extending through clearance holes in the ring gear and extending into suitable tapped holes in the shoulder 18. A plurality of planet pinions 20 only one of which is illustrated are mounted in circumferentially spaced relationship upon a planet carrier 21 which positions the planet pinions between and in mesh with the sun gear 16 and the internal ring gear 17. The planet carrier 21 is secured to the differential output shaft 22 journalled in bearings 23 in a bearing housing 24 forming a part of the cone pulley end plate 25. A sleeve 26 on the end plate 25 fits within the right end of cone pulley 2 and terminates in flange 27 abutting the end of the cone pulley, which positively locates this end plate concentrically and axially of the cone pulley. This end plate is secured by screws 28 extending through clearance holes in flange 27 and threading into suitable tapped holes in the end of cone pulley 2.

Differential output shaft 22 is frictionally connected to a pulley 29 by means of a friction type of clutch generally designated C1. Pulley 29 represents the input to a drive such as G1 between the differential output shaft and the error detector E. This friction clutch is conventional in principle and comprises a plurality of spring biased friction plates 30 which are alternately connected to a clutch member 31 secured to differential output shaft 22 and a sleeve 32 rotatably mounted about the output shaft and secured to the cone pulley 29. With this arrangement the magnitude of torque deliverable to the pulley 29 is determined by the transmitting capacity of the friction clutch.

Pulley 29 is connected by a belt 33 to a pulley 34 driving a potentiometer type of rheostat such as designated E. It will be appreciated that such a position error detector may also be a suitably wound rotor, wound stator inductively coupled device wherein the voltage induced in the secondary of such a device varies as a function of the angular displacement of the rotor of the device from a given angular position. Other suitable devices may obviously be utilized as the position error detecting means. Pulleys 29 and 34 are cluster pulleys utilizing a V-belt drive 33 and provide an interesting feature of the drive consisting in the adjustable gain or amplification of the regulator obtained by the use of such pulleys. It is always desirable to operate the error detecting device at maximum speed so as to obtain quick response of the system; however, in certain cases where the inertia of the section being regulated is high it is desirable to reduce the speed of movement of the error detector and this arrangement makes it relatively easy to do so by simply shifting the belt 33 to obtain the desired drive rate. This can be done by an inexperienced operator.

Although the friction clutch connected in the drive between differential output shaft 22 and the error detector E has been indicated at the pulley 29, it will be appreciated that this connection may be provided with equal facility at the pulley 34. The primary purpose of a connection such as this is to provide a means for slipping this drive with respect to the input to the error detector which usually is limited in angular movement by mechanical stops. Thus sufficient torque is achieved in the drive to drive the movable element of the error detector at rates of acceleration at least equal to the maximum acceleration rates required but when the rotating element of the detector encounters the stops therein the friction connection permits the drive to slip to avoid damage to the error detector.

By movement of the belt shifter assembly or carriage axially of the cone pulleys the drive ratio between the cone pulleys is varied. To this end the belt shifter carriage is mounted for axial movement along the length of the cone pulleys. A sectional view of the belt shifter carriage 7 is illustrated in Fig. 4. This section is taken through the carriage along an axis parallel to the axes of the cone pulleys as illustrated by section lines IV—IV of Fig. 2. This belt shifter carriage comprises a body portion having end plates 35 and 36. These end plates are secured in spaced relation as indicated by a pair of spacers 37 appearing only in Fig. 2 and a spacer 38 which appears in both Fig. 2 and Fig. 4. Spacer 38 is of tubular configuration having a hole 39 extending therethrough. The end portions of this tubular spacer are tapped at 40 to receive screws 41 which extend through respective end plates 35 and 36 and thread into the tapped end sections to secure the assembly.

The belt shifter 42 comprises a magnetizable plate 43, the configuration of which is best seen in dotted outline in Fig. 2. The ends of this plate project above and below the carriage respectively and have mounted thereon respective yokes 42a and 42b which engage the opposite sides of belt 3. Plate 43 is provided with a slot extending through one side thereof having arcuate side portions 45 about the geometric center of the plate. A sleeve bearing 46 is fitted through the arcuate side portions of this slot and secured to the magnetizable plate 43 by any suitable means such as welding or brazing.

Sleeve 46 is slidably mounted about the tubular spacer and is secured against rotation about the sleeve by means of a pin 47 which moves through slotted openings 48 at diametrically opposite points in the walls of the tubular spacer and is secured in sleeve 46. Provision is made for centrally positioning the belt shifter 42 substantially centrally of the carriage along the tubular spacer. Specifically this provision includes a shoulder 49 which is formed centrally within the tubular spacer. Plungers 50 and 51 are slidably fitted into the tubular spacer on opposite sides of shoulder 49 and abut the shoulder. These plungers are maintained in the position indicated by respective compression springs 52 and 53 which are compressed between the respective plungers 50 and 51 and the screws 41 which are threaded into the ends of the tubular spacer. In the position illustrated the pin 47 is biased to a central position along the tubular spacer and when displaced to one side or the other, it must move against the force of the respective springs which tend also to move the pin and hence, the belt shifter to its central position. Consequently, this belt shifter is resiliently secured in a central position on the belt shifter carriage. The pin 47 is sufficiently small in dimension between the confronting faces of plungers 50 and 51 to slightly clear the plunger faces when the plungers abut the shoulder 49. Thus, a strong centering bias is applied to the pin 47 and the spring load of the inactive spring, when the pin 47 is displaced from central position, is carried by the shoulder 49.

The plate 43 is formed of magnetic material and constitutes the armature for a pair of oppositely disposed electromagnets 54 and 55. The respective electromagnets comprise magnetizing coils 56 and 57 which are of substantially annular configuration and are disposed about the sleeve 46 against the respective inner faces of end plates 35 and 36. The magnetic circuit of the respective magnets include respective annular members 58 and 59 which are disposed about the respective coils 56 and 57. The ends of these annular members adjacent the respective end plates are fitted respectively into a suitable groove which is milled in the inner face of each plate and secured in this position by means of welding or brazing. The remaining ends of these annular members confront opposite sides of the armature plate 43 and are spaced therefrom in an amount to provide limited movement of the belt shifter with respect to the carriage by magnetic attraction in either direction from the centrally illustrated position. Small angle sections or rings of angular cross-section designated 60 and 61 are respectively fitted over the ends of respective members 58 and 59 which confront the opposite sides of the armature plate to prevent sticking of the armature plate to the pole faces constituted by the ends of the respective annular members.

Figure 6:
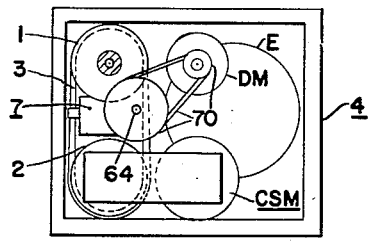
Fig. 6 is an elevational view taken along the line VI—VI of Fig. 5 to show the belt change drive mechanism.
Figure 5:
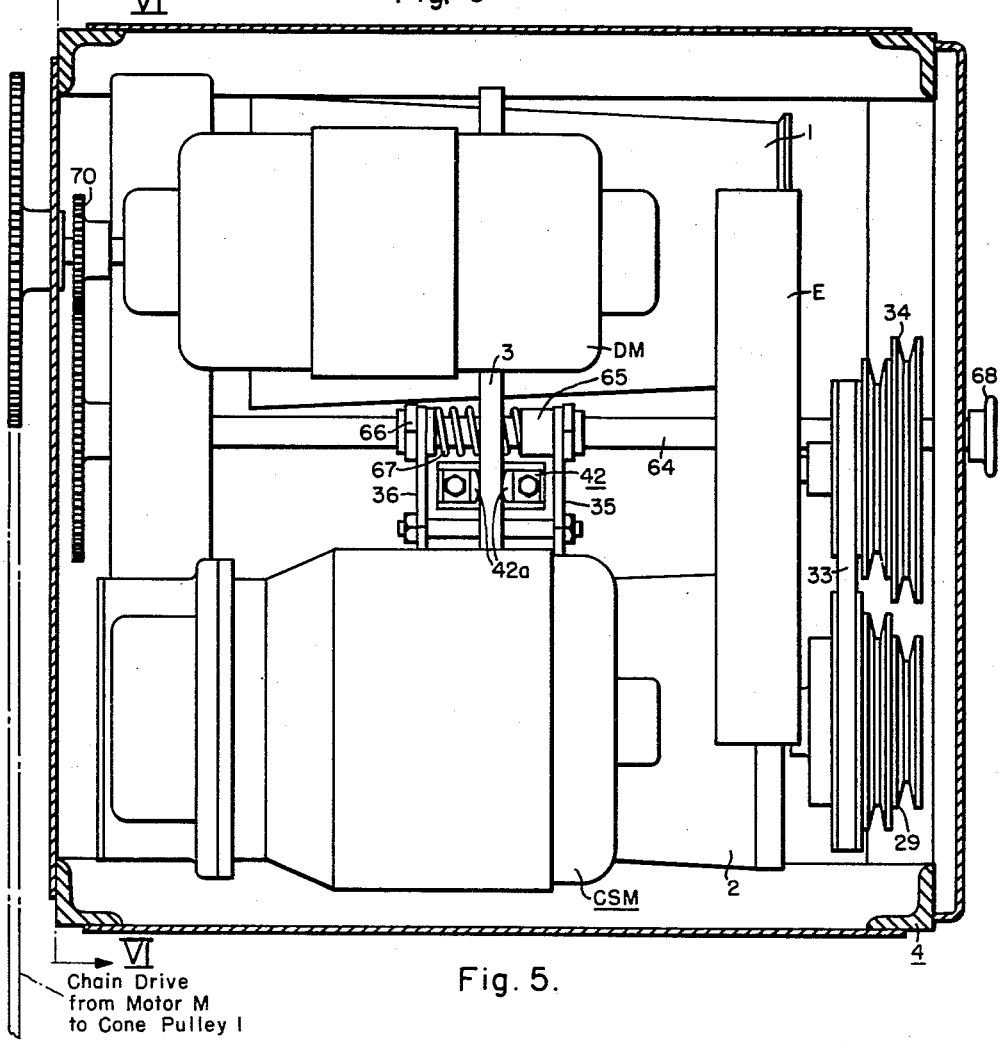
Fig. 5 is a plan view of the mechanical drive of Figs. 2 and 3.

The belt shifter carriage is mounted upon a pair of bars or rods which are supported between the ends of the housing 4 in positions paralleling the axis of the cone pulleys 1 and 2. The lower rod 62, in Fig. 4 and also Fig. 2, is secured in fixed relation with respect to the housing and forms a guide over which slots 63 in the bottom edges of the respective end plates 35 and 36 are fitted so that the carriage may slide therealong. The upper rod 64 is threaded along its length and is rotatably mounted in suitable bearings not shown in the ends of housing 4. The threaded rod 64 engages nuts 65 and 66 which are secured in respective end plates 35 and 36 adjacent the upper ends of these plates. Back-lash is taken out of the threaded mechanical connection by means of a compression spring 67 which is compressed between respective nuts 65 and 66. This compression spring biases the nut 65 and 66 away from one another an amount sufficient to securely engage the faces of the threads of the nuts with the faces of the threads of the threaded bar or shaft 64. In accomplishing this, nut 66 is provided with a square or rectangular shank 66a which slidably fits through a square hole 66b in plate 36. Since the thread faces thus engaged are oppositely disposed, rotation of the bar in either direction results in positive movement without loss of motion of the belt shifter carriage, in one direction or the reverse. The means for rotating the threaded shaft 64 may be a suitable crank or knob 68, shown in dot-dash outline in Fig. 2 only, secured to the end of the threaded shaft in a position projecting beyond the boundaries of housing 4 so that it may be easily reached. Alternatively, this shaft may be motor operated from a remote point. For this purpose a draw adjustment motor DM, connected to the end of threaded rod 64 opposite the crank 68, by means of chain and sprocket drive 70, may be employed, see Fig. 6.

With the structural arrangement herein described, the angular rate of the output shaft of the differential is an indication of the difference in speed between the cone pulley 2 which is driven by the cone pulley 1 and the shaft 12 which later represents the other input connection of the differential. The angular position of the differential output shaft at any instant with respect to a given reference position is an indication in a change in angular relation between cone pulley 2 and the shaft 12. The electric intelligence developed by the position error detector E or other suitable device as shown in Fig. 1 controls the motor M in such a way as to match the speed of cone pulley 2 with the shaft 12. In effect, the drive herein described is basically a position regulator comparing actual revolutions of the reference represented in shaft 12 with a speed represented in revolutions of cone pulley 2 which is a function of the speed of the member or motor being controlled. A system incorporating such a drive therefore, synchronizes the angular position of cone pulley 2 with that of shaft 12 tending always to insure maximum accuracy of regulation.

The details whereby adjustment of the draw of a particular section of the mill may be achieved are now more readily appreciated. The adjustment of drive ratio provided by the belt shifter carriage drive affords the desired control of the motor driving a particular section of the mill to obtain satisfactory mill operation.

At such times, however, as it is found desirable to affect a momentary change in the draw of a section of a mill in order to take up slack accumulations in the web or to introduce a slight amount of slack in the web, the adjustment may be conveniently made, without changing the draw setting for the particular section, through the control afforded by the electromagnets which provide slight adjustment of the belt shifter from its mid position between the two electromagnets.

These electromagnets may be connected in series with respective push-buttons PB1 and PB2 across a supply of electrical energy EV. Thus, selective energization of the magnets by operation of the respective push-buttons will permit a small adjustment of the belt shifter with respect to the belt shifter carriage to thereby provide a momentary adjustment of section draw.

Although but one embodiment of this invention has been illustrated in the accompanying drawing and but one application of this invention has been indicated, it will be appreciated that numerous other applications are feasible and that numerous variations in the details of components and in the organization of the respective components may be made by those skilled in the art without departing from the spirit and scope of this invention. Accordingly, it is intended that the foregoing disclosure and the illustrations in the drawings are to be considered only as illustrative of the principles of this invention and not interpreted in a limiting sense.

We claim as our invention:

1. A variable speed differential comprising, a support, a driving cone pulley rotatably mounted on said support, motor means for driving said driving cone pulley, a hollow shaft fixed on said support with the axis thereof parallel to the axis of the first cone pulley, a driven cone pulley, said driven cone pulley having a hollow end, bearing means rotatably mounting said driven cone pulley about said hollow shaft, a belt connecting said cone pulleys, a drive shaft rotatably mounted on said hollow shaft and projecting at one end out of said hollow shaft into the hollow end of said second cone pulley, means for driving said drive shaft, a spur gear secured to said one end of said drive shaft, an internally toothed ring gear secured within the hollow end of said second cone pulley in a plane defined by said spur gear, a rotatably mounted planet gear carrier, at least one planet gear meshing with both said ring gear and said spur gear and rotatably mounted on said planet gear carrier, and means responsive to angular movement of said planet gear carrier for indicating the difference in speed between said driven pulley and said drive shaft.

2. A variable speed differential comprising a support, a driving cone pulley rotatably mounted on said support, means for driving said driving cone pulley, a hollow shaft fixed on said support, a driven cone pulley having a hollow end, bearing means rotatably mounting said driven cone pulley about said hollow shaft, a belt connecting said cone pulleys, belt shifter means engaging said belt for moving said belt along said pulleys, a drive shaft rotatably mounted in said hollow shaft and projecting at one end thereof from said hollow shaft into the hollow end of said hollow cone pulley, means for driving said drive shaft, a spur gear secured to said one end of said drive shaft, an internally toothed ring gear secured within said hollow end of said hollow cone pulley in a plane defined by said spur gear, a planet carrier, an end plate secured over said hollow end of said hollow cone pulley, bearing means rotatably mounting said planet carrier in said end plate in a position coaxially of said drive shaft, at least one planet gear rotatably mounted on said planet carrier between and meshing with both said ring gear and said spur gear, and means responsive to angular movement of said planet carrier for indicating the difference in speed between said driven pulley and said drive shaft.

3. Apparatus for indicating a difference in angular position between two rotatable bodies comprising, a support, a driving cone pulley rotatably mounted on said support and adapted to be driven by one of said bodies, a hollow shaft mounted on said support with the axis thereof substantially parallel to the axis of said first cone pulley, a driven cone pulley having a hollow end, bearing means rotatably mounting said driven cone pulley about said hollow shaft, a belt connecting said cone pulleys, a drive shaft rotatably mounted in said hollow shaft and projecting therefrom at one end into said hollow end of said driven cone pulley, said drive shaft being driven by the other of said bodies, a spur gear secured to said one end of said drive shaft, an internally toothed ring gear disposed within said hollow end of said driven cone pulley substantially in the plane defined by said spur gear, a planet carrier rotatably mounted coaxially of said drive shaft, at least one planet gear rotatably mounted on said planet carrier and meshing with both said ring gear and said spur gear, an electrical pickoff device having a rotatable member, means including a slip clutch connecting said planet carrier with said rotatable member of said electrical pickoff, and means responsive to the electrical output of said electrical pickoff for controlling one of said bodies.

4. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, a planet carrier rotatably mounted coaxially of said drive shaft, at least one planet gear rotatably mounted on said planet carrier and meshing with both said ring gear and said spur gear, an electrical pickoff device having a rotatable member, and a variable speed drive connecting said planet carrier with said rotatable member of said electrical pickoff.

5. Apparatus for indicating a difference in angular position between two rotatable bodies comprising, a support, a first cone pulley rotatably mounted on said support and adapted to be driven by one of said bodies, a hollow shaft mounted on said support with the axial thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, a planet carrier rotatably mounted coaxially of said drive shaft, at least one planet gear rotatably mounted on said planet carrier and meshing with both said ring gear and said spur gear, an electrical pickoff device having a rotatable member, means including a slip clutch connecting said planet carrier with said rotatable member of said electrical pickoff, a variable speed drive connecting said planet carrier with said rotatable member of said electrical pickoff, and a slip clutch connected with said variable speed drive.

6. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, a planet carrier rotatably mounted coaxially of said drive shaft, at least one planet gear rotatably mounted on said planet carrier and meshing with both said ring gear and said spur gear, an electrical pickoff device having a rotatable member, a pulley cluster connected to said rotatable member of said electrical pickoff, a pulley cluster connected to said planet carrier, and a belt connecting said pulley clusters, said belt being adjustable between corresponding pulleys of said respective pulley clusters to vary the drive ratio therebetween.

7. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, a planet carrier having a shaft, bearing means rotatably mounting said planet carrier shaft coaxially of said drive shaft, at least one planet gear rotatably mounted on said planet carrier and meshing with both said ring gear and said spur gear, an electrical pickoff device having a rotatable input shaft, a pulley cluster on said shaft of said electrical pickoff, a pulley cluster on said shaft of said planet carrier, a belt connecting corresponding pulleys of said pulley clusters, said belt being adjustable between corresponding pulleys of said respective clusters to vary the drive ratio therebetween, and a slip clutch connecting one pulley cluster to the shaft therefor.

8. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, a planet carrier having a shaft, bearing means rotatably mounting said planet carrier shaft coaxially of said drive shaft, at least one planet gear rotatably mounted on said planet carrier and meshing with both said ring gear and said spur gear, an electrical pickoff device having a rotatable input shaft, a pulley cluster on said shaft of said electrical pickoff, a pulley cluster on said shaft of said planet carrier, a belt connecting corresponding pulleys of said pulley clusters, said belt being adjustable between corresponding pulleys of said respective clusters to vary the drive ratio therebetween, a slip clutch connecting one pulley cluster to the shaft therefor, said slip clutch comprising a plurality of engaged friction plates alternately connected to the pulley cluster and the shaft therefor, means supporting said friction plates for relative axial movement and spring means axially biasing said plates into frictional engagement.

9. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, an end plate mounted on the end of said hollow cone pulley adjacent to said ring gear, a planet carrier having a shaft, bearing means in said end plate rotatably mounting said shaft of said planet carrier coaxially of said drive shaft, said shaft of said planet carrier extending through said end plate, at least one planet gear rotatably mounted on said planet carrier in a position meshing with both said ring gear and said spur gear, an electrical pickoff device having an input shaft, and drive means connecting said planet carrier shaft with said input shaft of said electrical pickoff.

10. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, an end plate mounted on the end of said hollow cone pulley adjacent to said ring gear, a planet carrier having a shaft, bearing means in said end plate rotatably mounting said shaft of said planet carrier coaxially of said drive shaft, said shaft of said planet carrier extending through said end plate, at least one planet gear rotatably mounted on said planet carrier in a position meshing with both said ring gear and said spur gear, an electrical pickoff device having an input shaft, and means including a variable speed drive connecting said planet carrier shaft to said input shaft of said electrical pickoff.

11. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, an end plate mounted on the end of said hollow cone pulley adjacent to said ring gear, a planet carrier having a shaft, bearing means in said end plate rotatably mounting said shaft of said planet carrier coaxially of said drive shaft, said shaft of said planet carrier extending through said end plate, at least one planet gear rotatably mounted on said planet carrier in a position meshing with both said ring gear and said spur gear, an electrical pickoff device having an input shaft, means including a variable speed drive connecting said planet carrier shaft to said input shaft of said electrical pickoff, and a slip clutch forming part of the driving connection for limiting the transmitted torque between said planet carrier shaft and said input shaft of said electrical pickoff.

12. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, an end plate mounted on the end of said hollow cone pulley adjacent to said ring gear, a planet carrier having a shaft, bearing means in said end plate rotatably mounting said shaft of said planet carrier coaxially of said drive shaft, said shaft of said planet carrier extending through said end plate, at least one planet gear rotatably mounted on said planet carrier in a position meshing with both said ring gear and said spur gear, an electrical pickoff device having an input shaft, means including a variable speed drive connecting said planet carrier shaft to said input shaft of said electrical pickoff, a slip clutch forming part of the driving connection for limiting the transmitted torque between said planet carrier shaft and said input shaft of said electrical pickoff, and said slip clutch comprising a plurality engaged friction plates.

13. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, an end plate mounted on the end of said hollow cone pulley adjacent to said ring gear, a planet carrier having a shaft, bearing means in said end plate rotatably mounting said shaft of said planet carrier coaxially of said drive shaft, said shaft of said planet carrier extending through said end plate, at least one planet gear rotatably mounted on said planet carrier in a position meshing with both said ring gear and said spur gear, an electrical pickoff device having an input shaft, a pulley cluster connected to said planet carrier shaft, a pulley cluster connected to said input shaft of said electrical pickoff, and a belt connecting corresponding pulleys of said respective clusters, said belt being movable between corresponding pulleys of said respective clusters to vary the drive ratio therebetween.

14. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, an end plate mounted on the end of said hollow cone pulley adjacent to said ring gear, a planet carrier having a shaft, bearing means in said end plate rotatably mounting said shaft of said planet carrier coaxially of said drive shaft, said shaft of said planet carrier extending through said end plate, at least one planet gear rotatably mounted on said planet carrier in a position meshing with both said ring gear and said spur gear, an electrical pickoff device having an input shaft, a pulley cluster connected to said planet carrier shaft, a pulley cluster connected to said input shaft of said electrical pickoff, a belt connecting corresponding pulleys of said respective clusters, said belt being movable between corresponding pulleys of said respective clusters to vary the drive ratio therebetween, and a slip clutch connecting one of said pulley clusters with the shaft therefor.

15. Apparatus for indicating a difference in angular position between two rotatable bodies comprising, a support, a first cone pulley rotatably mounted on said support and adapted to be driven by one of said bodies, a hollow shaft mounted on said support with the axis thereof substantially parallel to the axis of said first cone pulley, a hollow cone pulley, bearing means rotatably mounting said hollow cone pulley about said hollow shaft, a belt connecting said cone pulleys, a drive shaft rotatably mounted in said hollow shaft and projecting therefrom at one end into said hollow cone pulley, a spur gear secured to said one end of said drive shaft, an internally toothed ring gear disposed within said hollow cone pulley substantially in the plane defined by said spur gear, an end plate mounted on the end of said hollow cone pulley adjacent to said ring gear, a planet carrier having a shaft, bearing means in said end plate rotatably mounting said shaft of said planet carrier coaxially of said drive shaft, said shaft of said planet carrier extending through said end plate, at least one planet gear rotatably mounted on said planet carrier in a position meshing with both said ring gear and said spur gear, an electrical pickoff device having an input shaft, a pulley cluster connected to said planet carrier shaft, a pulley cluster connected to said input shaft of said electrical pickoff, a belt connecting corresponding pulleys of said respective clusters, said belt being movable between corresponding pulleys of said respective clusters to vary the drive ratio therebetween, a slip clutch connecting one of said pulley clusters with the shaft therefor, and said slip clutch comprising a plurality of spring loaded friction plates alternately engaging said one pulley cluster and the shaft therefor.

References Cited in the file of this patent

UNITED STATES PATENTS

| | | |
|---|---|---|
| 1,792,109 | Maxson | Feb. 10, 1931 |
| 2,346,047 | Otto | Apr. 4, 1944 |
| 2,588,187 | Weiser | Mar. 4, 1952 |